United States Patent
Nonoyama et al.

[11] Patent Number: 5,987,905
[45] Date of Patent: Nov. 23, 1999

[54] AIR CONDITIONING APPARATUS FOR VEHICLE

[75] Inventors: Hiroshi Nonoyama, Toyota; Takayoshi Kawai, Hoi-gun; Toshihiko Muraki; Tetsuya Takechi, both of Kariya; Junji Yokoi, Toyota; Makoto Mimoto, Chita-gun, all of Japan

[73] Assignee: Denso Corporation, Kariya, Japan

[21] Appl. No.: 09/168,711

[22] Filed: Oct. 8, 1998

[30] Foreign Application Priority Data

Oct. 9, 1997 [JP] Japan ................................. 9-277736

[51] Int. Cl.⁶ ..................................................... B60H 1/00
[52] U.S. Cl. ................................ 62/133; 62/244; 62/409; 454/75; 165/249
[58] Field of Search ............................... 62/133, 186, 244, 62/177, 178, 179, 180, 409; 454/75, 256, 258; 165/202, 203, 204, 42, 43, 248, 249; 236/49.3

[56] References Cited

U.S. PATENT DOCUMENTS 4,566,373 1/1986 Ohashi ...................................... 454/75
5,074,463 12/1991 Suzuki et al. .......................... 62/244 X
5,361,593 11/1994 Dauvergne ............................. 62/133 X
5,699,960 12/1997 Kato et al. ............................. 454/75 X

FOREIGN PATENT DOCUMENTS 5-124426 5/1993 Japan .
9-76733 3/1997 Japan .

*Primary Examiner*—Harry B. Tanner
*Attorney, Agent, or Firm*—Harness, Dickey Pierce, PLC

[57] ABSTRACT

An air conditioning apparatus for a vehicle includes an air conditioning case for forming an air passage through which air is blown into a passenger compartment. In the air conditioning apparatus, during a cooling mode for cooling a passenger compartment, an inside/outside air introduction mode is switched from an inside/outside air-mixing mode where both inside air and outside air are introduced into the air conditioning case to an entire outside air mode where only outside air is introduced into the air conditioning case, when an engine of the vehicle is stopped and the cooling load is smaller than a predetermined cooling load. Therefore, air-suction noise from an inside air introduction port is not caused, and the air-suction noise is not noted by a passenger in the passenger compartment even when the engine is stopped. Thus, noise of the air conditioning apparatus in the passenger compartment can be reduced.

15 Claims, 7 Drawing Sheets

AIR CONDITIONING APPARATUS FOR VEHICLE

CROSS-REFERENCE TO RELATED APPLICATION

This application is related to and claims priority from Japanese Patent Application No. Hei. 9-277736 filed on Oct. 9, 1997, the contents of which are hereby incorporated by reference.

BACKGROUND OF THE INVENTION

1. Field of the Invention

This invention relates to an air conditioning apparatus for a vehicle, more particularly, relates to an inside/outside air switching unit for the air conditioning apparatus.

2. Description of Related Art

In a conventional air conditioning apparatus, an inside/outside air introduction mode is manually switched by a passenger in a passenger compartment between an entire inside air mode (i.e., inside air circulation mode) and an entire outside air mode (i.e., outside air introduction mode), or is automatically switched according to a cooling load of the passenger compartment. In the automatic control of the inside/outside air introduction mode, the entire inside air mode is automatically selected to improve cooling capacity when the cooling load of the passenger compartment is larger than a predetermined value, and the entire outside air mode is automatically selected to ventilate the passenger compartment when the cooling load of the passenger compartment is smaller than a predetermined value. Further, the cooling load is determined by a target air temperature (TAO) of the passenger compartment. Therefore, the entire outside air mode or the entire inside air mode is automatically selected according to the TAO.

In the recent years, noise from an engine of the vehicle is greatly reduced. Therefore, noise from an air conditioning apparatus is noted by a passenger in a passenger compartment. The noise caused from the engine becomes lower, when a rotation speed of the engine is low (e.g., engine idling), or when the engine is stopped to reduce an exhaust gas even when a passenger is in the passenger compartment. Thus, in this case, air-suction noise of the air conditioning apparatus, which is caused when inside air is sucked from an inside air introduction port in the passenger compartment, is more noted by the passenger in the passenger compartment.

SUMMARY OF THE INVENTION

In view of the foregoing problems, it is an object of the present invention to provide an air conditioning apparatus for a vehicle, which reduces noise in a passenger compartment.

According to the present invention, an air conditioning apparatus for a vehicle includes a first control unit for automatically controlling an inside air amount introduced from an inside air introduction port and an outside air amount introduced from an outside air introduction port to set an air introduction mode according to a cooling load or a heating load of a passenger compartment, and a second control unit which reduces the inside air amount set by the first control unit when a rotation speed of the engine is lower than a predetermined speed and the cooling load of the passenger compartment is smaller than a predetermined cooling load. Therefore, air-suction noise of the air conditioning apparatus, caused when inside air introduced, can be reduced in the passenger compartment. Thus, even when noise from the engine becomes smaller, the air-suction noise is not noted by a passenger in the passenger compartment.

Preferably, the second control unit switches the air introduction mode set by the first control unit to a first air mode where only outside air is introduced into an air conditioning case from the outside air introduction port, when the rotation speed of the engine is lower than the predetermined speed and the cooling load of the passenger compartment is smaller than the predetermined cooling load. Therefore, when the rotation speed of the engine becomes lower, noise in the passenger compartment can be further reduced.

More preferably, the first control unit sets a second air mode where at least inside air is introduced into the air conditioning case when the cooling load is larger than a first predetermined value, the first control unit sets the first air mode when the cooling load is smaller than the first predetermined value, and the second control unit switches the air introduction mode from the second air mode set by the first control unit to the first air mode when the cooling load is in a range between the first predetermined value and a second predetermined value larger than the first predetermined value. Further, the second control unit selects the second air mode set by the first control unit when the cooling load is larger than the second predetermined value. Because the first air mode is selected by the second control unit when the passenger compartment is cooled and a large cooling capacity is not necessary in the passenger compartment, the air-suction noise of the air conditioning apparatus can be reduced while the cooling capacity is not affected greatly. On the other hand, when the large cooling capacity is necessary, the second air mode is set, and inside air having a low temperature is introduced to increase the cooling capacity of the passenger compartment.

Still more preferably, the first control unit selects a double layer flow mode even when the rotation speed of the engine is lower than the predetermined speed, when the heating load is larger than a predetermined heating load. Therefore, when the heating load is larger than the predetermined heating load, that is, when a larger heating capacity is necessary in the passenger compartment, the double laminar flow mode is selected to improve both of the heating capacity of the passenger compartment and the defrosting performance of a windshield.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In the embodiment of the present invention, an air conditioning apparatus is applied to a vehicle having an engine in which heat generated in the engine is too small to heat cooling water with engine sufficiently. Particularly, in the embodiment, the air conditioning apparatus is mounted on a hybrid vehicle which can be traveled by at least one of an internal combustion engine (hereinafter referred to as "engine") 100 shown in FIG. 3 and an electrical motor (not shown) for travelling. A battery is mounted in the hybrid vehicle, and is automatically charged by the engine 100 when a charging amount of the battery becomes smaller. When the battery has a sufficient electrical power, the vehicle is to driven by the electrical motor. Further, when the vehicle is traveling in a sloping road and a traveling load of the vehicle becomes larger, the vehicle is driven by both the engine 100 and the electrical motor.

Further, in the embodiment, the engine 100 is automatically stopped by an engine control unit 101 to improve fuel consumption rate and to reduce exhaust gas, when the vehicle is stopped temporarily at a crossing, for example.

Figure 1:
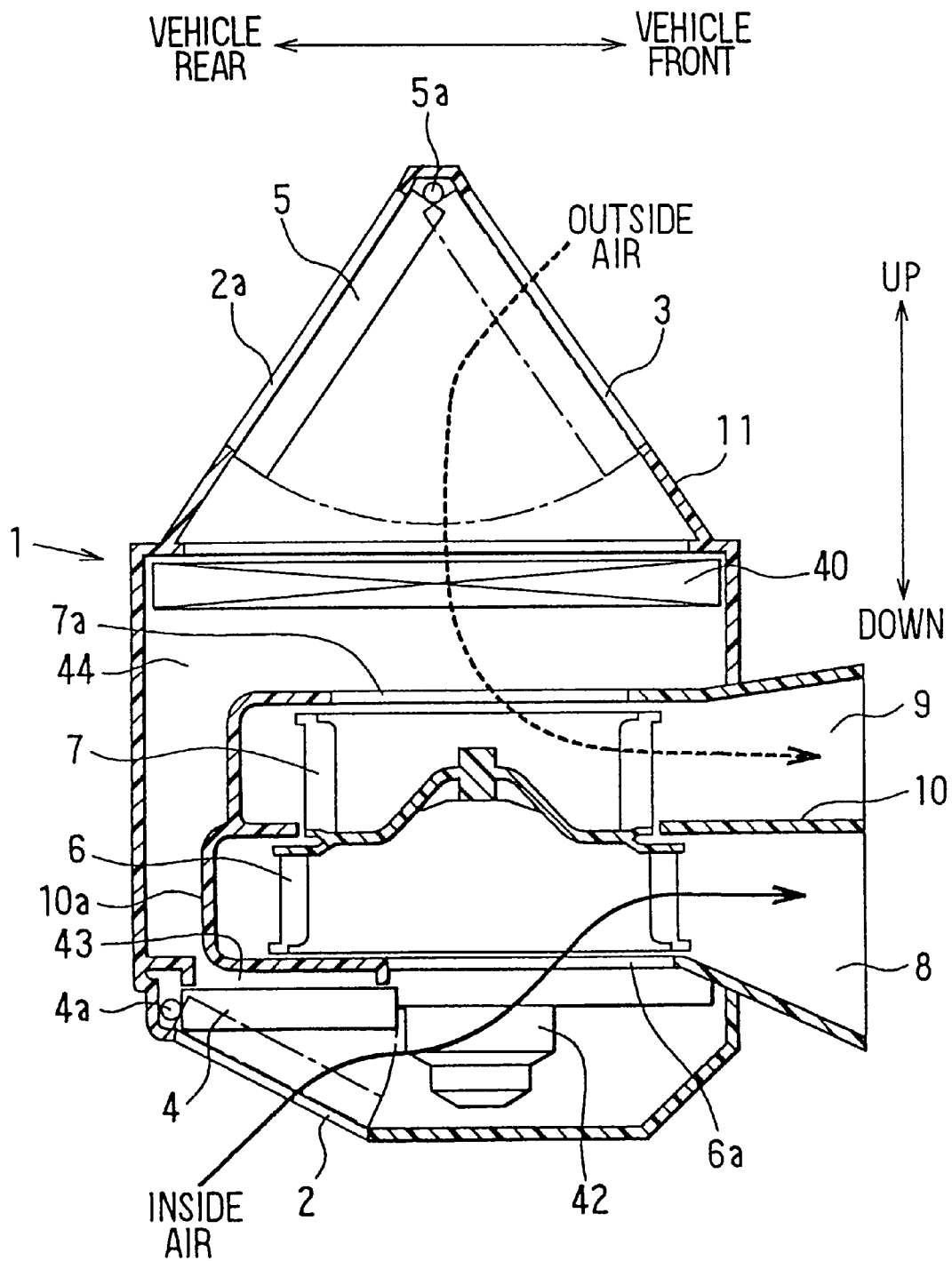
FIG. 1 is a schematic sectional view showing a blower unit of an air conditioning apparatus according to a preferred embodiment of the present invention.
Figure 2:
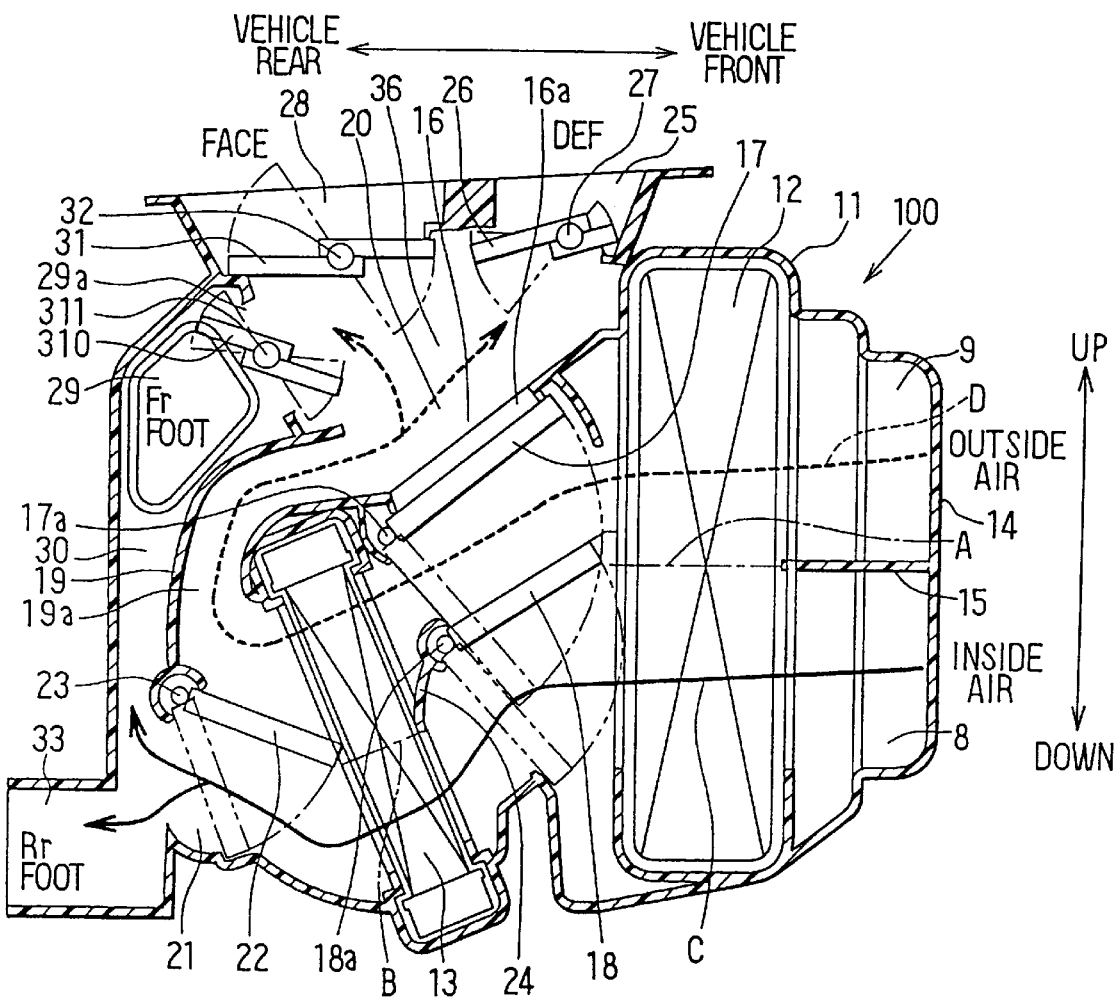
FIG. 2 is a schematic sectional view showing an air conditioning unit of the air conditioning apparatus according to the embodiment.

The air conditioning apparatus includes a blower unit (inside/outside air switching unit) 1 shown in FIG. 1, and an air conditioning unit 100 shown in FIG. 2. The air conditioning unit 100 is disposed under an instrument panel in a passenger compartment at an approximate center portion in a left-right direction of the vehicle. On the other hand, the blower unit 1 is disposed under the instrument panel at a side of the air conditioning unit 100 in the left-right direction of the vehicle. In the embodiment, the blower unit 1 is disposed at a front passenger's seat side next to a driver's seat.

First, the blower unit 1 will be now described. The blower unit 1 is provided with first and second inside air introduction ports 2 and 2a for introducing inside air (i.e., air inside the passenger compartment) and an outside air introduction port 3 for introducing outside air (i.e., air outside the passenger compartment). The first inside air introduction port 2 is provided at a lower portion of the blower unit 1, and is opened and closed by a first inside/outside air switching door 4. The outside air introduction port 3 and the second inside air introduction port 2a are provided adjacently at an upper portion of the blower unit 1, and are opened and closed by a second inside/outside air switching door 5.

The first and second inside/outside air switching doors 4 and 5 are rotated respectively around rotary shafts 4a and 5a. The first and second inside/outside air switching doors 4 and 5 are plate-like doors, and are operatively linked and rotated by an actuator such as a servomotor through a link mechanism, based on control signals from an electronic control unit (hereinafter referred to as "ECU") 50 of the air conditioning apparatus. Thus, an inside air amount and an outside air amount introduced into an air conditioning case 11 of the air conditioning unit 100 are respectively controlled by the first and second inside/outside air switching doors 4, 5.

An air filter 40 for cleaning air introduced from the outside air introduction port 3 and the second inside air introduction port 2a are disposed at a lower side of the second inside/outside air switching door 5 in an up-dow direction of the vehicle. A first fan 6 and a second fan 7 for blowing air introduced from the air introduction ports 2, 2a and 3 are disposed at a lower side of the air filter 40 in the up-down direction. The first and second fans 6 and 7 are centrifugal multi-blades fans (e.g., sirocco fan), and are rotated simultaneously by a single common electric motor 42.

The electric motor 42 for driving the first and second fans 6, 7 is disposed at a lower side of the first fan 6. The first fan 6 has a first suction port 6a communicating with the first inside air introduction port 2. The first suction port 6a of the first fan 6 can communicate with a space 44 at a downstream side of the air filter 40, through a communication path 43. The first inside/outside air switching door 4 also opens and closes the communication path 43 while opening and closing the first inside air introduction port 2. A partition plate 10 is disposed within the blower unit 1 between the first and second fans 6, 7 so that an air passage of the blower unit 1 is partitioned into a first air passage 8 and a second air passage 9. The partition plate 10 may be formed integrally with a scroll casing 10a made of resin, for accommodating both the first and second fans 6 and 7.

Next, an inside/outside air introduction mode of the blower unit 1 of the air conditioning apparatus will be described.

(1) Double Layer Flow Mode

FIG. 1 shows a state of the double layer flow mode or an inside/outside air-mixing mode of the blower unit 1. As shown in FIG. 1, during the double layer flow mode or the inside/outside air-mixing mode, the first and second inside/outside air switching doors 4 and 5 are rotated to the solid line positions in FIG. 1. Because the first inside/outside air switching door 4 opens the first inside air introduction port 2 and closes the communication path 43 communicating with the outside air introduction port 3, inside air is sucked into the suction port 6a of the first fan 6. On the other hand, because the second inside/outside air switching door 5 closes the second inside air introduction port 2a and opens the outside air introduction port 3, outside air is sucked into a suction port 7a of the second fan 7 through the air filter 40. Therefore, in this state, the first fan 6 blows inside air from the inside air introduction port 2 into the first air passage 8, and the second fan 7 blows outside air from the outside air introduction port 3 into the second air passage 9.

In the embodiment, the double layer flow mode is selected when a maximum heating state is set during a foot mode or a foot/defroster mode. On the other hand, the inside/outside air-mixing mode is generally set during a cooling mode for cooling the passenger compartment.

(2) Entire Outside Air Mode

When the entire outside air mode is set, the first inside/outside air switching door 4 is rotated to the chain line position in FIG. 1, and the second inside/outside air switching door 5 is rotated to the solid line position in FIG. 1. That is, during the entire outside air mode, because the first inside/outside air switching door 4 closes the first inside air introduction port 2 and opens the communication path 43 communicating with the outside air introduction port 3, only outside air having passed through the air filter 40 is introduced into both the first and second air passages 8, 9.

(3) Entire Inside Air Mode

When the entire inside air mode is set, the first inside/outside air switching door 4 is rotated to the solid line position in FIG. 1, and the second inside/outside air switching door 5 is rotated to the chain line position in FIG. 1. That is, during the entire inside air mode, the first inside/outside air switching door 4 opens the first inside air introduction port 2 and closes the communication path 43 communicating with the outside air introduction port 3, and the second inside/outside air switching door 5 opens the second inside air introduction port 2a and closes the outside air introduction port 3. Therefore, during the entire inside air mode, inside air from the first inside air introduction port 2 is introduced into the first air passage 8, and inside air from the second inside air introduction port 2a is introduced into the second air passage 9.

Next, the air conditioning unit 100 will be described with reference to FIG. 2.

In the air conditioning unit 100, an evaporator (i.e., cooling heat exchanger) 12 and a heater core (i.e., heating heat exchanger) 13 are accommodated in the air conditioning case 11. The air conditioning case 11 is made of resin which L5 has an elasticity to some degree and is superior in a strength, such as ploypropylene, and is composed of both division cases each having a division surface in a vertical direction (i.e., up-down direction of the vehicle) in FIG. 2. The division cases are integrally connected by fastening means such as a metal spring clip and a screw, after the heat exchangers 12 and 13, and components such as a door (described later) are accommodated therein, to construct the air conditioning unit 100.

At the most front side in the air conditioning case 11, an air inlet 14 for introducing air from the blower unit 1 is provided. Therefore, air blown from the blower unit 1 flows into the air inlet 14 of the air conditioning unit 100. Because the air inlet 14 communicates with an air outlet of the blower unit 1 disposed at the front passenger's seat side next to the driver's seat, the air inlet 14 is also opened at the front passenger's seat side. At a position immediately after the air inlet 14 in the air conditioning case 11, there is disposed the evaporator 12 to cross whole areas of the first and second air passages 8 and 9. As being known well, the evaporator 12 is for cooling air while absorbing an evaporation latent heat of a refrigerant of a refrigeration cycle from air. As shown in FIG. 2, the evaporator 12 is thin in the front-rear direction of the vehicle and is disposed in the air conditioning case 11 in such a manner that a longitudinal direction thereof extends in the up-down direction of the vehicle.

An air passage extending from the air inlet 14 to the evaporator 12 is partitioned by a partition plate 15 into the first air passage 8 at a lower side of the vehicle and the second air passage 9 at an upper side of the vehicle. The partition plate 15 is formed integrally with the air conditioning case 11 by using resin, and is a stationary partition member extending approximately in a horizontal direction that is horizontal relative to the front-rear direction and the left-right direction of the vehicle. The partition plate 15 may be formed separately from the air conditioning case 11, and may be connected and fixed to the air conditioning case 11 by using fastening means such as a screw and an adhesive.

The evaporator 12 is of a laminated type in which a plurality of flat tubes, each of which is formed by connecting two metal thin plates made of aluminum or the like to each other, are laminated to sandwich a corrugated fin between adjacent flat tubes, and then integrally brazed.

At a downstream side (i.e., vehicle rear side) of the evaporator 12, there is adjacently disposed the heater core 13 to form a predetermined distance therebetween. The heater core 13 is for heating air having passed through the evaporator 12. In the heater core 13, high-temperature cooling water (hot water) for cooling the engine 100 of the vehicle flows, and the heater core 13 heats air by using the cooling water as heat source. Similar to the evaporator 12, the heater core 13 is thin in the front-rear direction of the vehicle, and is disposed in the air conditioning case 13 so that a longitudinal direction of the heater core 13 is in the up-down direction of the vehicle. In the embodiment, the heater core 13 is slightly inclined toward a vehicle rear side by a small angle. The heater core 13 is disposed in the air conditioning case 11 to form a cool air bypass passage 16 at an upper side of the heater core 13. Through the cool air bypass passage 16, air having passed through the evaporator 12 bypasses the heater core 13.

Plate-like first and second air-mixing doors 17 and 18 for adjusting an amount of air passing through the heater core 13 and an amount of air bypassing the heater core 13 are disposed between the heater core 13 and the evaporator 12 within the air conditioning case 11. Both the first and second air-mixing doors 17, 18 are connected to rotary shafts 17a, 18a, respectively, and are rotated in the up-down direction with the rotations of the rotary shafts 17a, 18a. The rotary shafts 17a, 18a are rotatably held in the air conditioning case 11. One side ends of the rotary shafts 17a, 18a protrude to the outside of the air conditioning case 11, and are connected to an actuator such as a servomotor through a link mechanism. The first and second air-mixing doors 17, 18 are operatively linked and are rotated according to temperature control signals from the ECU 50 of the air conditioning apparatus.

The rotary shaft 17a of the first air-mixing door 17 is disposed at an upper side of the rotation shaft 18a of the 5 second air-mixing door 18 to form a predetermined distance between both the rotary shafts 17a, 18a, so that the rotations of the first and second air-mixing doors 17, 18 are not restricted from each other. During the maximum cooling state, both the first and second air-mixing doors 17, 18 are respectively rotated to chain line positions in FIG. 2 to be overlapped, and are press-fitted to a protrusion rib of the air conditioning case 11 to close an air inlet of the heater core 13.

On the other hand, during the maximum heating state, the first and second air mixing doors 17, 18 are rotated to the solid line positions in FIG. 2. Therefore, the first air-mixing door 17 closes an inlet hole 16a of the cool air bypass passage 16 and a top end of the second air-mixing door 18 is disposed at a position immediately after the evaporator 12 to be proximate to an extending line A of the partition plate 15. Therefore, during the maximum heating state, the second air-mixing door 18 is used as a movable partition member for partitioning an air passage between the evaporator 12 and the heater core 13 into the first air passage 8 and the second air passage 9.

A partition wall 19 extending in the up-down direction is formed integrally with the air conditioning case 11 at a downstream side of the heater core 13 to form a predetermined distance therebetween. By the partition wall 19, a first warm air passage 19a extending from the heater core 13 upwardly is formed in the air conditioning case 11. A downstream side (an upper side) of the first warm air passage 19a is joined with the cool air bypass passage 16 in an air-mixing chamber 20 at an upper side of the heater core 13. A warm air bypass inlet 21 is provided at a lower end (i.e., upstream end) of the partition wall 19 to be opposite to a downstream surface of the heater core 13, and is opened and closed by a warm air bypass door 22. The warm air bypass door 22 is connected to a rotary shaft 23 which is rotatably held in the air conditioning case 11 at an upper end portion of the warm air bypass inlet 21. The warm air bypass door 22 is rotated around the rotary shaft 23 between the solid line position and the chain line position in FIG. 2. In the embodiment, the warm air bypass door 22 is rotated by the actuator for driving the first and second air-mixing doors 17, 18 through a link mechanism, to be operatively linked with the both air-mixing doors 17, 18.

In the embodiment, the double layer flow mode is set during the maximum heating state. When the double layer flow mode is set during a foot mode or a foot/defroster mode, the warm air bypass door 22 is rotated to the solid line position in FIG. 2 (i.e., at a position proximate to a partition line B of the heater core 13) so that the first warm air passage 19a at a position immediately after the heater core 13 is also partitioned into the first air passage 8 and the second air passage 9. That is, the warm air bypass door 22 is used as a movable partition member for partitioning an air passage at an immediately downstream side of the heater core 13 into both air passages corresponding to the first and second air passages 8, 9. Therefore, the partition wall 19 disposed at a downstream side of the warm air bypass door 22 is also used as a stationary partition member for partitioning the first and second air passages 8, 9 from each other.

The heater core 13 is of a laminated type in which a plurality of flat tubes, each of which is formed by connecting two metal thin plates made of aluminum or the like to each other, are laminated to sandwich a corrugated fin between adjacent flat tubes, and then integrally brazed.

A stationary partition plate 24 is disposed between an upstream surface at the partition line B and the rotary shaft 17a of the second air-mixing door 18, and is formed integrally with the air conditioning case 11.

A defroster opening portion 25 is provided on an upper wall portion of the air conditioning case 11 at a vehicle front side. Conditioned air from the air-mixing chamber 20 flows into the defroster opening portion 25, and is blown toward an inner surface of a windshield of the vehicle from a defroster air outlet through a defroster duct. The defroster opening portion 25 is opened and closed by a defroster door 26 rotated around a rotary shaft 27.

On the upper wall portion of the air conditioning case 11, a face opening portion 28 is formed at a vehicle rear side of the defroster opening portion 25. Conditioned air from the air-mixing chamber 20 flows into the face opening portion 28 through the communication path 36, and is blown toward the head portion of a passenger in the passenger compartment from a face air outlet through a face duct. The face air outlet is provided on an upper portion of an instrument panel of the vehicle.

A front foot opening portion 29 is provided in a rear side wall of the air conditioning case 11, at an upper side thereof. Conditioned air from the air-mixing chamber 20 flows into the front foot opening portion 29 through the communication path 36. When the maximum heating state is set, the warm air bypass inlet 21 is opened by the warm air bypass door 22, and air from the warm air bypass inlet 21 flows into the front foot opening portion 29 through the second warm air passage 30 while conditioned air from the air-mixing chamber flows into the front foot opening portion 29. Air from the front foot opening portion 29 is blown toward the foot area of a passenger seated on a front seat in the passenger compartment from a front foot air outlet through a front foot duct.

The face opening portion 28 is opened and closed by a face door 31 rotated by a rotary shaft 32. An inlet hole 29a of the front foot opening portion 29 is opened and closed by a foot door 310 rotated by a rotary shaft 311.

A rear foot opening portion 33 is provided on the rear side wall of the air conditioning case 11, and is opened to be opposite to a position directly after the warm air bypass inlet 21. Air from the warm air bypass inlet 21 and air from the second air passage 30 flow into the rear foot opening portion 33, and is blown toward the foot area of a passenger seated on a rear seat of the passenger compartment from a rear foot air outlet through a rear foot duct.

In the embodiment, when the double layer flow mode is set during the foot mode, the warm air bypass door 22 is rotated to the solid line position in FIG. 2 so that the air passage at an immediately downstream side of the heater core 13 is partitioned into the first and second air passages 8, 9. However, the first and second air passages 8, 9 communicate with each other through the communication path 36 provided at a position proximate to an inlet of the defroster opening portion 25 and an inlet of the front foot opening portion 29.

The defroster door 26, the face door 31 and the foot door 310 are operatively linked and rotated by an actuator such as a servomotor through a link mechanism, based on control signals from the ECU 50 of the air conditioning apparatus.

In the embodiment, during the double layer flow mode, the air passage between the evaporator 12 and the heater core 13 is partitioned by the second air-mixing door 18 as the movable partition member, and the air passage at the immediately downstream side of the heater core 13 is also partitioned by the warm air bypass door 22 as the movable partition member. On the other hand, during the inside/outside air-mixing mode set in the cooling mode, because the first and second air-mixing doors 17, 18 are rotated to the intermediate positions, inside air and outside air are mixed after being passed through the evaporator 12.

Each of the plate-like doors 4, 5, 17, 18, 22, 26, 31 has a door base plate which is made of resin or metal and is integrally connected to each of the rotary shafts 4a, 5a, 17a, 18a, 23, 27, 32. An elastic seal material such as polyurethane foam are bonded on both surfaces of each door base plate so that the doors 4, 5, 17, 18, 22, 26, 31 are formed.

Figure 3:
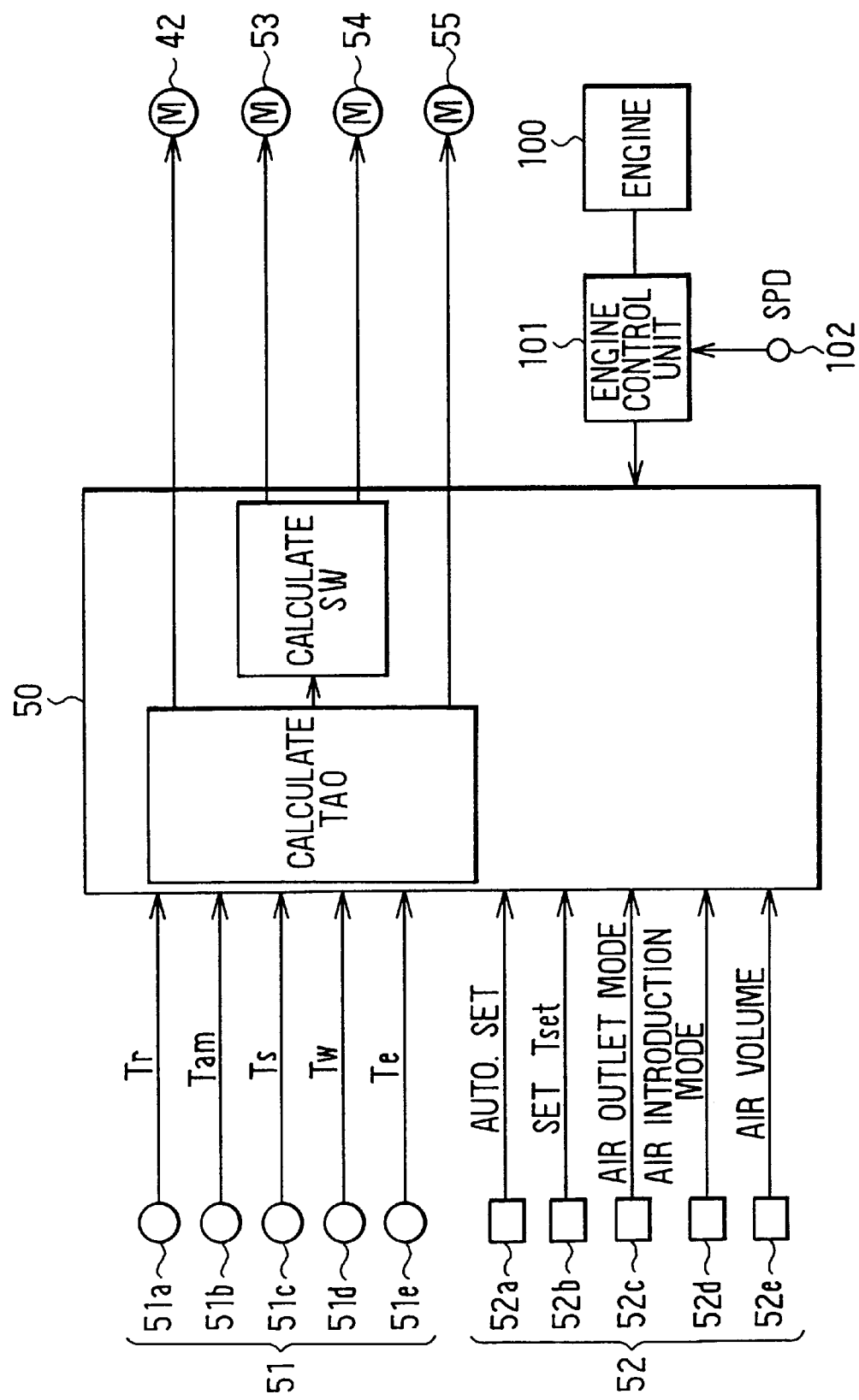
FIG. 3 is a block diagram showing an electric control of an electronic control unit (ECU) of the air conditioning apparatus according to the embodiment.

Next, the control operation of the ECU 50 constituted by a microcomputer will be now described. As shown in FIG. 3, sensor signals from a sensor group 51 including various sensors 51a–51e and operation signals from an operation group 52 including various operation units 52a–52e are input to the ECU 50. The various operation units 52a–52e are provided on an air-conditioning operation panel of the vehicle. Further, a vehicle speed (SPD) detected by a vehicle speed sensor 102 is input to the ECU 50 through an engine control unit 101 for controlling a rotation speed of the engine 100.

In the ECU 50, calculation processes are performed based on a pre-set program stored in ROM according to the input signals from the sensor group 51, the operation group 52, and the vehicle speed (SPD) from the vehicle speed sensor 102. Thereafter, the ECU 50 outputs control signals to the electric driving motor 42 of the first and second fans 6, 7 and servomotors 53–55 of actuators. That is, the servomotors 53–55 include a servomotor 53 which drives the first and second inside/outside air switching doors 4, 5 through a link mechanism, a servomotor 54 which drives the first and second air-mixing doors 17, 18 and the warm air bypass door 22 operatively linked, and a servomotor 55 which drives the defroster door 26, the face door 31 and the foot door 310 operatively linked. The servomotor 54 drivers the warm air bypass door 22 after rotating the first and second air-mixing doors 17, 18 to a predetermined position.

The operation group 52 includes an automatic air-conditioning control unit 52a for automatically controlling the temperature of air blown toward the passenger compartment, a temperature setting unit 52b for setting a target temperature of the passenger compartment, an air outlet mode setting unit 52c, an inside/outside air setting unit 52d, an air amount setting unit 52e. The sensor group 51 includes an inside air temperature sensor 51a for detecting a temperature of inside air, an outside air temperature sensor 51b for detecting a temperature of outside air, a sunlight amount sensor 51c for detecting an amount of sunlight entering into the vehicle, a water temperature sensor 51d for detecting a temperature of hot water flowing into the heater core 13, and an evaporator air temperature sensor 51e for detecting a temperature of air at an air outlet of the evaporator 12.

Figure 4:
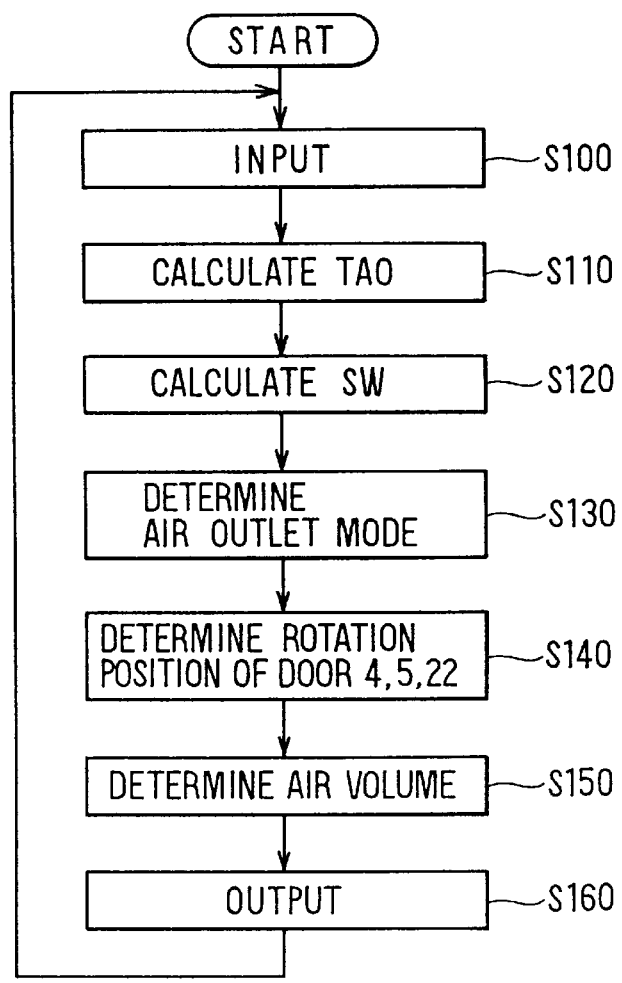
FIG. 4 is a flow chart of a control precess of the electronic control unit according to the embodiment.

Next, the control processes of the ECU 50 of the air conditioning apparatus will be now described. In the embodiment, a control routine shown in FIG. 4 is performed by the ECU 50. The control routine of the ECU 50 is started, when an ignition switch of the engine and the automatic air-conditioning control unit 52a are turned on. Firstly, various sensor signals from the sensor group 51 and various operation signals from the operation group 52 are input at step S100.

At step S110, a target air temperature (TAO) of air blown into the passenger compartment is calculated based on the following formula (1).

$$TAO = Kset \times Tset - Kr \times Tr - Kam \times Tam - Ks \times Ts + C \quad (1)$$

wherein, Kset is a temperature setting gain, Tset is a temperature set by the temperature setting unit 52b, Kr is an inside air temperature gain, Tr is an inside air temperature detected by the inside air temperature sensor 51a, Kam is an outside air temperature gain, Tam is an outside air temperature detected by the outside air temperature sensor 51b, Ks is a sunlight gain, Ts is an amount of sunlight, detected by the sunlight sensor 51c, and C is a correction constant.

Next, at step S120, a target opening degree SW of the first and second air-mixing doors 17, 18 is calculated based on the following formula (2).

$$SW = [(TAO-Te)/(Tw-Te)] \times 100\% \quad (2)$$

in which, TAO is the target air temperature calculated at the step S110, Te is a temperature detected by the evaporator air temperature sensor 51e, and Tw is a cooling water temperature detected by the water temperature sensor 51d.

Figure 5:
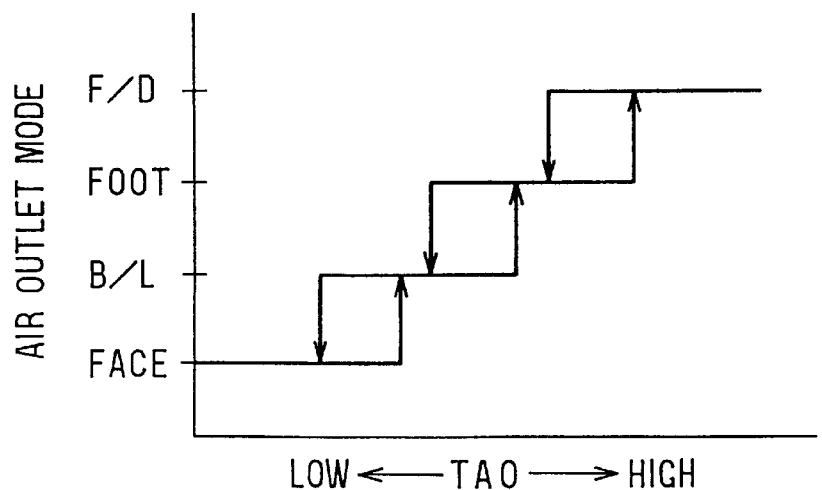
FIG. 5 is a graph showing the relationship between a target air temperature (TAO) and an air outlet mode according to the embodiment.

At step S130, an air outlet mode is determined according to the TAO, based on a map in FIG. 5 which is stored previously in the ROM. That is, as shown in FIG. 5, when the TAO is changed from a low temperature side to a high temperature side, the air outlet mode is changed from a face mode (FACE), a bi-level mode (B/L), a foot mode (FOOT) to a foot/defroster mode (F/D) in this order.

Here, each air outlet mode of the air conditioning unit 100, selected in FIG. 5 will be described.

(1) Face Mode

During the face mode, the face door 31 opens the face opening portion 28, the foot door 310 closes the inlet hole 29a of the front foot opening portion 29, and the defroster door 26 closes the defroster opening portion 25. Therefore, during the face mode, conditioned air is only blown into the face opening portion 28.

(2) Bi-Level Mode

During the bi-level mode, the face door 31 opens the face opening portion 28, the foot door 310 opens the inlet hole 29a of the front foot opening portion 29, and the defroster door 26 closes the defroster opening portion 25. Therefore, during the bi-level mode, conditioning air is blown into the face opening portion 28, the front foot opening portion 29 and the rear foot opening portion 33.

(3) Foot Mode

During the foot mode, the face door 31 closes the face opening portion 28, the foot door 310 opens the inlet hole 29a of the front foot opening portion 29, and the defroster door 26 opens the defroster opening portion 25. Therefore, during the foot mode, conditioned air is blown into the front foot opening portion 29, the defroster opening portion 25 and the rear foot opening portion 33.

(4) Foot/Defroster Mode

During the foot/defroster mode, similarly to the foot mode, the face door 31 closes the face opening portion 28, the foot door 310 opens the inlet hole 29a of the front foot opening portion 29, and the defroster door 26 opens the defroster opening portion 25. Therefore, during the foot/defroster mode, conditioned air is blown into the front foot opening portion 29, the defroster opening portion 25 and the rear foot opening portion 33. However, during the foot/defroster mode, the defroster opening portion 25 is opened with a larger opening degree as compared with the foot mode.

Figure 6:
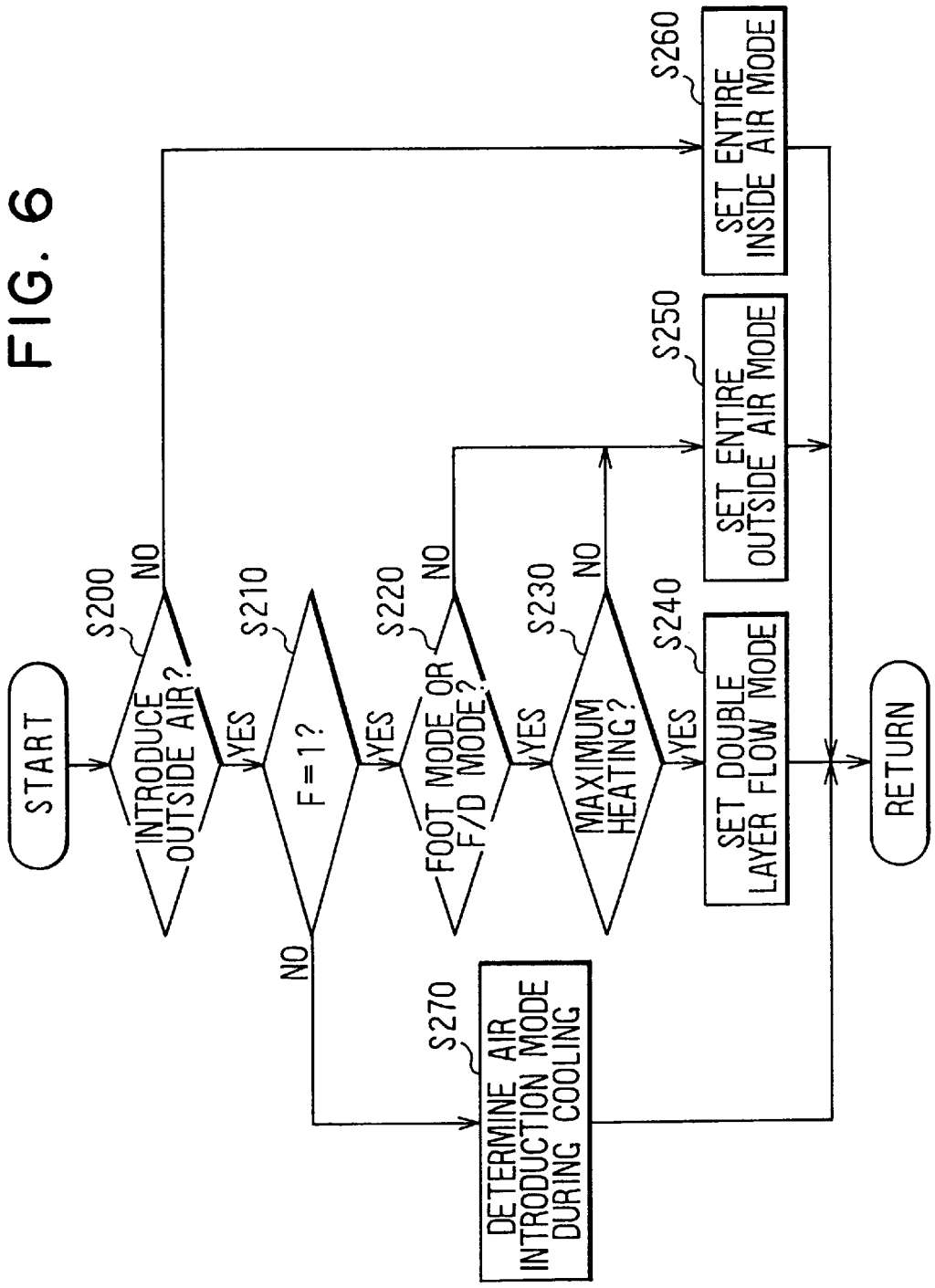
FIG. 6 is a flow chart showing a control precess of the electronic control unit according to the embodiment.

Next, at step S140 in FIG. 4, the rotation positions of the first and second inside/outside switching doors 4, 5 and the warm air bypass door 22 are determined based on the control program shown in FIG. 6. Thereafter, at step S150, the air amount blown by the first and second fans 6, 7 are determined according to a pre-stored map based on the TAO. Next, at step 160, control signals determined at steps S120–S150 are output.

Figure 7:
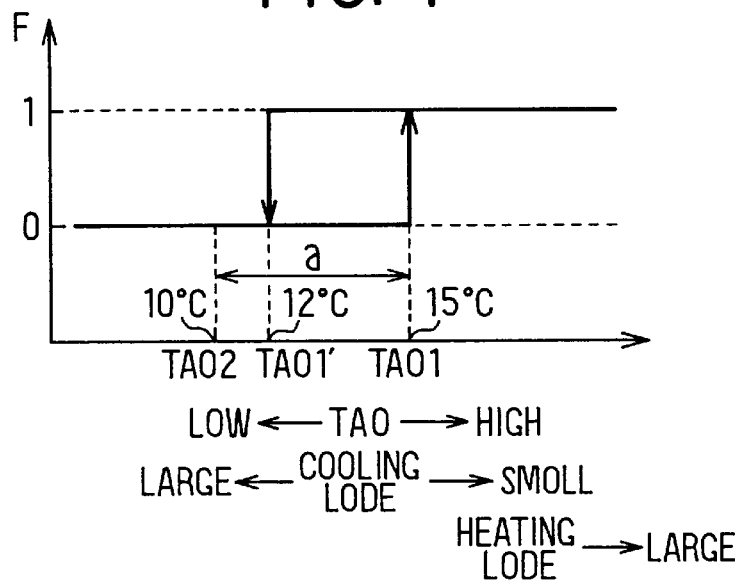
FIG. 7 is a graph showing the relationship between the TAO and an inside/outside air introduction mode set provisionally.

Here, the control of the rotation positions of the first and second inside/outside air switching doors 4, 5 at step S140 in FIG. 4 will be described in detail. That is, as shown in FIG. 6, at step S200, it is determined whether or not the inside/outside air setting unit 52d is set at an outside air introduction position. When the inside/outside air setting unit 52d is set at the outside air introduction position, it is determined whether or not "F" is equal to 1(i.e., "F"=1). Here, the "F" is a level for provisionally setting the entire outside air mode or the inside/outside air-mixing mode according to the TAO. That is, according to a cooling load or a heating load of the passenger compartment, an inside/outside air introduction mode is provisionally set. In the embodiment, the "F" is determined based on the graph shown in FIG. 7 pre-set in the ECU 50. As shown in FIG. 7, when the TAO is increased from a low temperature side to a high temperature side, the "F" is set at 1 when the TAO is larger than a first predetermined temperature TAO1 (e.g. 15° C.). Therefore, as shown in FIG. 7, the entire outside air mode is provisionally set. In this case, when the TAO is lower than 15° C., the "F" is set at 0; and therefore, the inside/outside air-mixing mode is provisionally set. On the other hand, when the TAO is decreased from the high temperature side to the low temperature side, the "F" is 1when the TAO is higher than a first predetermined temperature TAO1' (e.g., 12° C.), or the "F" is 0 when the TAO is lower than the TAO1' (e.g., 12° C.). As shown in FIG. 7, the higher the TAO is, the smaller the cooling load of the passenger compartment is. Conversely, the lower the TAO is, the larger the cooling load of the passenger compartment is. In the embodiment, the cooling load and the heating load can be determined by the "F" set according to the TAO.

When the "F" is equal to 1 (i.e., F=1) at step S210 in FIG. 6, it is determined whether or not the air outlet mode is the foot mode or the foot/defroster (F/D) mode at step S220. When the air outlet mode is the foot mode or the foot/defroster mode, it is determined whether or not the air-mixing doors 17, 18 are rotated at the maximum heating positions based on the target opening degree SW at step S230. That is, in the embodiment, when the target opening degree SW is larger than a predetermined degree SW1 (e.g., 100%), the maximum heating state is determined. The calculated target opening degree SW indicates the heating load of the passenger compartment. When the air-mixing doors 17, 18 are positioned at the maximum heating positions so that the maximum heating state is set, the double layer flow mode is set at step S240. That is, at step S240, the first and second inside/outside air switching doors 4, 5 are rotated at the solid line position in FIG. 1, and the warm air bypass door 22 is rotated at the solid line position in FIG. 2.

When the double laminar mode is set at step S240 in FIG. 6, the inside air introduction port 2 communicates with the suction port 6a of the first fan 6, and the outside air introduction port 3 communicates with the suction port 7a of the second fan 7. Therefore, the first fan 6 blows inside air from the inside air introduction port 2 into the first air passage 8, and the second fan 7 blows outside air from the outside air introduction port 3 into the second air passage 9. In the air conditioning unit 100, both the first and second air-mixing doors 17, 18 are rotated to the solid line positions in FIG. 2. Therefore, the first air-mixing door 17 fully closes the inlet hole 16a of the cool air bypass passage 16, and the top end of the second air-mixing door 18 is approximately arranged on the extending line A of the partition plate 15 at an immediately downstream position of the evaporator 12. That is, the second air-mixing door 18 is used as the movable partition member for partitioning the air passage between the evaporator 12 and the heater core 13 into the first air passage 8 and the second air passage 9. The warm air bypass door 22 is rotated to the solid line position in FIG. 2 to open the warm air bypass inlet 21, so that a downstream air passage of the heater core 13 is also partitioned into both air passages corresponding to the first and second air passages 8, 9. In this case, the defroster door 26 opens the defroster opening portion 25 with a predetermined opening degree, the foot door 310 opens the inlet portion 29a of the front foot opening portion 29 with a predetermined opening degree, and the face door 31 closes the face opening portion 28. Thus, inside air from the inside air introduction port 2 and outside air from the outside air introduction port 3 respectively flow through the first air passage 8 and the second air passage 9 while being partitioned by the partition members 10, 15, 18, 22. All inside air and outside air pass through the heater core 13 so that the passenger compartment is heated in maximum.

During the double laminar mode, inside air heated in the heater core 13 passes through the warm air bypass inlet 21, and flows into the front and rear foot opening portions 29, 33 through the second warm air passage 30. On the other hand, outside air heated in the heater core 13 flows into the air-mixing chamber 20 through the first warm air passage 19a at an upper side of the warm air bypass door 22. Outside air in the air-mixing chamber 20 branches into two flows, one of which flows into the defroster opening portion 25 and the other of which flows into the front foot opening portion 29 through the communication path 36. Because outside air having a low humidity is heated and is blown toward the inner surface of the windshield through the defroster opening portion 25, the defrosting performance of te windshield can be improved. On the other hand, because inside air having a high temperature mainly flows into the front and rear foot opening portion 29, 33, the heating effect of the passenger compartment can be improved. In FIG. 2, arrow "C" indicates the flow of inside air, and arrow "D" indicates the flow of outside air during the double layer flow mode. During the double layer flow mode, since the defroster opening portion 25 is opened by the defroster door 26 with a small opening degree, a part of outside air in the second air passage 9 can flow toward the front foot opening portion 29. Therefore, a ratio between an amount of air flowing into the foot opening portions 29, 33 and an amount of air flowing into the defroster opening portion 25 can be set approximately at 80/20.

On the other hand, when the air outlet mode is not the foot mode or the foot/defroster mode at step S220, or when the maximum heating state is not set by the air-mixing doors 17, 18 at step S230, the entire outside air mode is set at step S250. That is, at step S250, the first inside/outside air switching door 4 is rotated at the chain line position in FIG. 1, the second inside/outside air switching door 5 is rotated at the solid line position in FIG. 1, and the warm air bypass door 22 is rotated at the chain line position in FIG. 2.

During the foot mode or the foot/defroster mode, when a temperature control area for controlling the temperature of blown-air is set from the maximum heating state, a general mode (inside/outside air-mixing mode) is set in the air conditioning unit 100 from the double layer flow mode. During the general mode, both the air-mixing doors 17, 18 are rotated at intermediate rotation positions. Therefore, the first airmixing door 17 opens the cool air bypass passage 16, and the second air-mixing door 18 is not used as the movable partition member. Thus, air having passed through the evaporator 12 flows into the air-mixing chamber 20 through the cool air bypass passage 16. During the general mode, the warm air bypass door 22 is also rotated to the chain line position in FIG. 2 with the rotation operation of the air-mixing doors 17, 18. Therefore, the warm air bypass door 22 closes the warm air bypass inlet 21, and all air having passed through the heater core 13 flows into the air-mixing chamber 20 through the first warm air passage 19 to be mixed with air from the cool air bypass passage 16.

Further, when the inside/outside air setting unit 52d is not set at the outside air introduction position at step S200 in FIG. 6, that is, when outside air is not introduced, the entire inside air mode is set at step S260. That is, at step S260, the first inside/outside air switching door 4 is rotated at the solid line position in FIG. 1, the second inside/outside air switching door 5 is rotated at the chain line position in FIG. 1, and the warm air bypass door 22 is rotated at the chain line position in FIG. 2.

On the other hand, when the "F" is not 1 at step S210 in FIG. 6, that is, when the "F" is zero (F=0), an inside/outside air introduction mode during the cooling mode is determined at step S270. When the "F" is zero, the TAO is lower than 15° C.; and therefore, the cooling load of the passenger compartment becomes larger so that the cooling mode is set.

Figure 8:
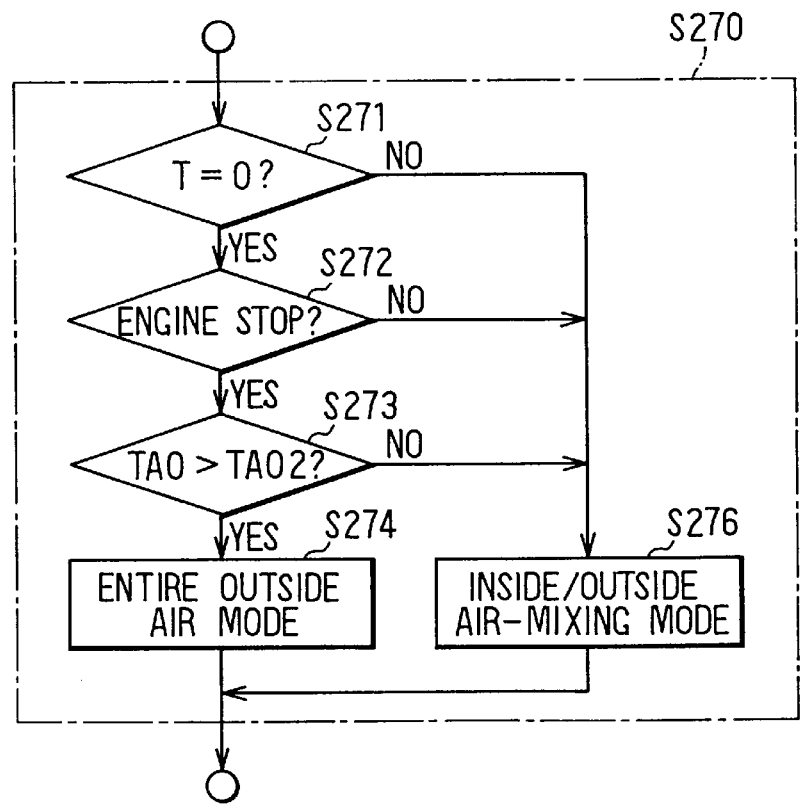
FIG. 8 is a flow chart showing a control precess of the electronic control unit during a cooling mode according to the embodiment.

The control at step S270 in FIG. 6 is explained in detain in FIG. 8. That is, at step S270, the inside/outside air introduction mode is switched between the inside/outside air-mixing mode and the entire outside air mode, during the cooling mode for cooling the passenger compartment. As shown in FIG. 8, it is determined whether or not "T" is zero (i.e., T=0) at step S271 according to the graph shown in FIG. 9. Here, the "T" is a level for determining a traveling state of the vehicle. When the "T" is zero, it is determined that the vehicle is stopped or is substantially stopped at step S271.

On the other hand, when the "T" is 1, it is determined that the vehicle is traveling at step S271.

Figure 9:
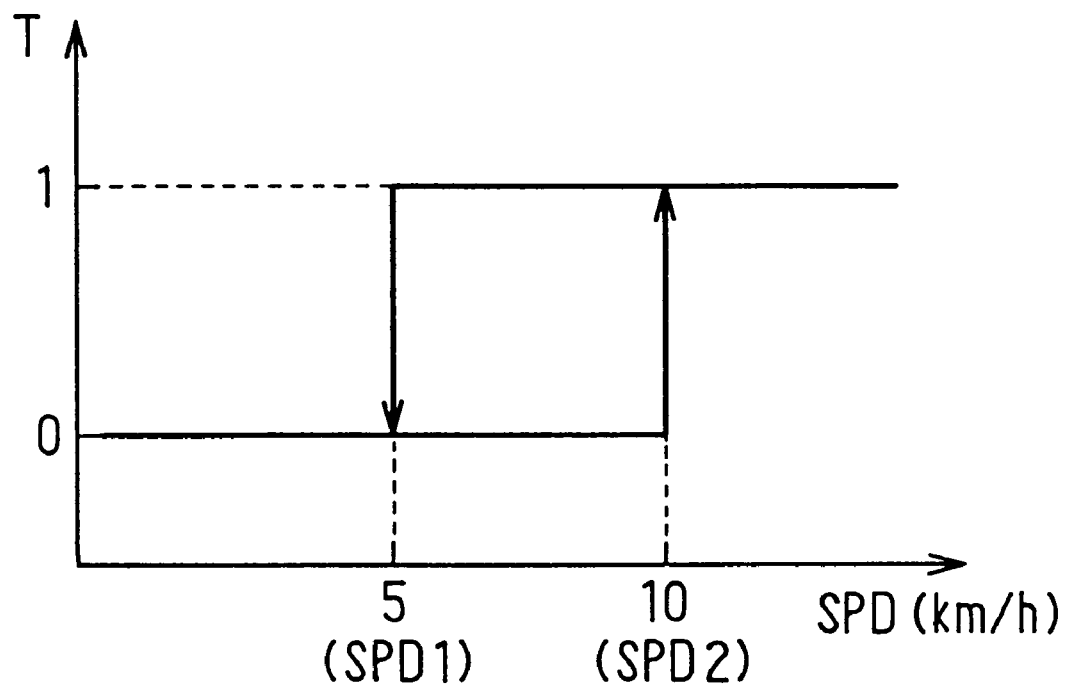
FIG. 9 is a graph for determining a travelling state of the vehicle based on a vehicle speed (SPD) according to the embodiment.

As shown in FIG. 9, when the vehicle speed (SPD) is smaller than a first predetermined speed (SPD1, e.g., 5 km/h), the "T" is set at zero, and it is determined that the vehicle is stopped or is substantially stopped. On the other hand, when the SPD becomes larger than a second predetermined speed (SPD2, e.g., 10 km/h), the "T" is set at 1, and it is determined that the vehicle is traveling. When the vehicle is traveling at step S271, the inside/outside air-mixing mode is set at step S276. During the inside/outside air-mixing mode, the inside/outside air switching doors 4, 5 are rotated similarly to the double layer flow mode. However, in this case, because the air-mixing doors 17, 18 and the warm air bypass door 22 are not rotated to the maximum heating positions, inside air and outside air are mixed in the air conditioning case 11 after being passed through the evaporator 12. Thus, when the cooling mode is set in the summer, for example, inside air having a low temperature is cooled, while outside air is introduced and cooled. Accordingly, the cooling capacity of the passenger compartment is increased while the passenger compartment is ventilated.

On the other hand, when it is determined that the "T" is zero, that is, when the vehicle is stopped or is substantially stopped at step S271, it is determined whether or not the engine 100 can be set to be stopped at step S272. Actually, the step S272 is performed in the engine control unit 101. For example, at step S272, it is determined whether or not the charging amount of the battery is smaller than a predetermined amount. When the charging amount of the battery is smaller than the predetermined amount, the engine 100 is not stooped to charge the battery, and the inside/outside air-mixing mode is set at step S276. Further, when the rotation speed of the engine 100 is smaller than a predetermined speed, it can be determined that the engine 100 is stopped or is substantially stopped.

When it is possible to stop the engine 100 at step S272, or when the rotation speed of the engine 100 is smaller than the predetermined speed, it is determined whether or not the TAO is lower than a second predetermined TAO2 at step S273. In the embodiment, because the step S270 is performed when the TAO is lower than the TAO1 of 15° C., the TAO2 is set to 10° C. lower than the TAO1, for example. Therefore, when the TAO is in a range "a" between the TAO1 and the TAO2 in FIG. 7, the entire outside air mode is set at step S274 during the cooling mode.

That is, in the embodiment, during the cooling mode, even when an inside/outside air introduction mode is provisionally set according to the cooling load (TAO), the entire outside air mode is selected when the vehicle and the engine are stopped and the cooling load is in the range between the TAO1 and the TAO2. When the engine 100 is stopped, noise from the engine 100 is not caused, the air-suction noise from the first inside air introduction port 2 is noted by the passenger in the passenger compartment. However, in this case, because the entire outside air mode is switched from the inside/outside air-mixing mode in the embodiment, the air-suction noise at the first inside air introduction port 2 is not caused, and noise in the passenger compartment can be greatly reduced.

Further, during the cooling mode, only when the TAO is in the range "a" between the TAO1 and the TAO2 in FIG. 7, the entire outside air mode is switched from the inside/outside air-mixing mode. For example, when the TAO is lower than 10° C., a large cooling capacity is required in the passenger compartment. In this case, the hot is more important for the passenger in the passenger compartment as compared with the air-suction noise. Therefore, when the TAO is lower than the second predetermined TAO2 (e.g., 10° C.), inside air having a low temperature is introduced in the inside/outside air-mixing mode so that the cooling capacity of the passenger compartment can be increased.

Further, when the passenger compartment is cooled and the temperature of the passenger compartment is lowered, that is, when the calculated TAO becomes higher during the cooling mode, the air-suction noise is more noted by the passenger in the passenger compartment as compared with the hot. Therefore, in this case, the entire outside air mode is switched from the inside/outside air-mixing mode. Even when the entire outside air mode is set, because the TAO is in a range "a" of TAO1 (e.g., 15° C.)–TAO2 (e.g., 10° C.), the cooling capacity of the passenger compartment is not decreased so much while the air-suction noise is decreased. That is, even when the entire outside air mode is set at step S270, it is in a case where a large cooling capacity is not necessary. Therefore, in this case, even when the entire outside air mode is switched from the inside/outside air-mixing mode, the air-suction noise can be reduced while the cooling capacity of the passenger compartment is not greatly affected.

Although the present invention has been fully described in connection with the preferred embodiment thereof with reference to the accompanying drawings, it is to be noted that various changes and modifications will become apparent to those skilled in the art.

For example, in the above-described embodiment, the inside/outside air introduction mode is switched from the inside/outside air-mixing mode to the entire outside air mode, on the premise that the engine 100 of the vehicle is stopped and the vehicle is stopped (or substantially stopped). However, the inside/outside air introduction mode may be switched from the inside/outside air-mixing mode to the entire outside air mode, on the premise that the vehicle is traveled by the electric motor and the rotation speed of the engine 100 is lower than a predetermined speed.

In the above-described embodiment, when the rotation speed of the engine is lower than the predetermined speed, the entire outside air mode is selected. However, when the rotation speed of the engine is lower than the predetermined speed, the introduction amount of inside air may be decreased without setting the entire outside air mode. That is, when the rotation speed of the engine 100 is lower than the predetermined speed and the cooling load is in the range between the TAO1 and the TAO2, the inside air amount introduced from the first inside air introduction port 2 is reduced.

In the above-described embodiment, the present invention is applied to the air conditioning apparatus which can set the double layer flow mode. However, the present invention may be applied to an air conditioning apparatus where the air passage in the air conditioning case 11 is not partitioned into both air passages. In the above-described embodiment, the inside/outside air introduction mode is automatically switched between the entire outside air mode, the inside/outside air-mixing mode, and the double layer flow mode. However, the present invention may be applied to an air conditioning apparatus where the inside/outside air introduction mode is switched between the entire inside air mode and the entire outside air mode. That is, when the rotation speed of the engine 100 is lower than the predetermined speed and the cooling load is in the range between the TAO1 and the TAO2, the entire outside air mode is switched from the entire inside air mode.

In the above-described embodiment, during the cooling mode for cooling the passenger compartment, the entire outside air mode is switched from the inside/outside air-mixing mode when the engine 100 is stopped. However, during a heating mode for heating the passenger compartment, the entire outside air mode may be switched from the double layer flow mode when the engine 100 is stopped and the heating load of the passenger compartment is lower than a predetermined heating load. Further, the present invention may be applied to an air conditioning apparatus where the amount of inside air and the amount of outside air introducing into the air conditioning case 11 are linearly controlled.

Further, in the above-described embodiment, the present invention is applied to the air conditioning apparatus mounted on a hybrid vehicle. However, the present invention may be applied to a vehicle which is driven by only the engine 100. In this case, when the rotation speed of the engine 100 is lower than a predetermined rotation speed (e.g., the rotation speed of an engine idling), the inside/outside air introduction mode may be automatically switched from a mode where a part of inside air is introduced to the entire outside air mode where only outside air is introduced.

Such changes and modifications are to be understood as being within the scope of the present invention as defined by the appended claims.

What is claimed is:

1. An air conditioning apparatus for a vehicle having a passenger compartment and an engine for driving the vehicle, said air conditioning apparatus comprising:

an air conditioning case for forming an air passage through which air is blown into the passenger compartment, said air conditioning case having an inside air introduction port for introducing inside air and an outside air introduction port for introducing outside air;

first control means for automatically controlling an inside air amount introduced from said inside air introduction port and an outside air amount introduced from said outside air introduction port to set an air introduction mode, according to a cooling load or a heating load of the passenger compartment; and second control means which reduces the inside air amount set by said first control means, when a rotation speed of the engine is lower than a predetermined speed and the cooling load of the passenger compartment is smaller than a predetermined cooling load.

2. The air conditioning apparatus according to claim 1, wherein said second control means reduces the inside air amount set by said first control means, when the rotation speed of the engine is lower than the predetermined speed and the heating load of the passenger compartment is smaller than a predetermined heating load.

3. The air conditioning apparatus according to claim 1, wherein said second control means switches said air introduction mode set by said first control means to a first air mode where only outside air is introduced into said air conditioning case from said outside air introduction port, when the rotation speed of the engine is lower than the predetermined speed and the cooling load of the passenger compartment is smaller than the predetermined cooling load.

4. The air conditioning apparatus according to claim 2, wherein said second control means switches said air introduction mode set by said first control means to a first air mode where only outside air is introduced into said air conditioning case from said outside air introduction port, when the rotation speed of the engine is lower than the predetermined speed and the heating load of the passenger compartment is smaller than the predetermined heating load.

5. The air conditioning apparatus according to claim 3, wherein:

said first control means sets a second air mode where at least inside air is introduced into said air conditioning case, when the cooling load is larger than a first predetermined value;

said first control means sets the first air mode, when the cooling load is smaller than the first predetermined value; and said second control means switches the air introduction mode from said second air mode set by said first control means to the first air mode, when the cooling load is in a range between the first predetermined value and a second predetermined value larger than the first predetermined value.

6. The air conditioning apparatus according to claim 5, wherein said second control means selects the second air mode set by said first control means when the cooling load is larger than the second predetermined value.

7. The air conditioning apparatus according to claim 3, further comprising:

an inside/outside air switching unit for controlling the inside air amount and the outside air amount introduced from said inside air introduction port and said outside air introduction port into said air conditioning unit; and a partition member for partitioning said air passage into a first air passage through which inside air flows and a second air passage through which outside air flows, wherein:

said air conditioning case has a first opening portion for blowing air toward a lower portion of the passenger compartment and a second opening portion for blowing air toward an inner surface of a windshield;

said partition member partitions said first and second air passages from each other during a double layer flow mode, in such a manner that first air passage communicates with said first opening portion and said second air passage communicates with said second opening portion;

said first control means controls said inside/outside air switching unit to set the double layer flow mode, when the heating load is larger than a predetermined heating load; and said first control means controls said inside/outside air switching unit to set the first air mode, when the heating load is smaller than the predetermined heating load.

8. The air conditioning apparatus according to claim 7, wherein said first control means controls said inside/outside air switching unit in such a manner that both inside air and outside air are introduced into said air conditioning case, when the cooling load is larger than the predetermined cooling load.

9. The air conditioning apparatus according to claim 8, wherein said first control means selects the double layer flow mode even when the rotation speed of the engine is lower than the predetermined speed, when the heating load is larger than the predetermined heating load.

10. The air conditioning apparatus according to claim 1, further comprising engine-stop control means for automatically stopping the engine, wherein said second control means controls the inside air amount and the outside air amount introduced from said inside air introduction port and said outside air introduction port, when the engine is stopped by said engine-stop control means.

11. The air conditioning apparatus according to claim 1, further comprising engine-stop determining means for determining that the engine is stopped or is substantially stopped, wherein said second control means controls the inside air amount and the outside air amount set by said first control means, when said engine-stop determining means determines that the engine is stopped or is substantially stopped.

12. The air conditioning apparatus according to claim 11, further comprising vehicle-stop determining means for determining that the vehicle is stopped or is substantially stopped, wherein said second control means controls the inside air amount and the outside air amount set by said first control means, when said vehicle-stop determining means determines that the vehicle is stopped or is substantially stopped.

13. An air conditioning apparatus for a vehicle having a passenger compartment and an engine for driving the vehicle, said air conditioning apparatus comprising:

an air conditioning case for forming an air passage through which air is blown into the passenger compartment, said air conditioning case having an inside air introduction port for introducing inside air and an outside air introduction port for introducing outside air;

a heat exchanger for cooling or heating air passing through said air passage;

cooling load determining means for determining a cooling load for cooling the passenger compartment when the cooling load is larger than a first predetermined value;

a first control unit for automatically controlling an inside air amount introduced from said inside air introduction port and an outside air amount introduced from said outside air introduction port to set an air introduction mode, according to the cooling load determined by said cooling load determining means; and a second control unit for controlling the inside air amount and the outside air amount set by said first control unit, wherein said second control unit reduces the inside air amount set by said first control unit, when a rotation speed of the engine is lower than a predetermined speed and the cooling load of the passenger compartment is larger than the first predetermined value and is smaller than a second predetermined value larger than the first predetermined value.

14. The air conditioning apparatus according to claim 13, wherein said second control unit switches said air introduction mode set by said first control unit to a first air mode where only outside air is introduced into said air conditioning case from said outside air introduction port, when the rotation speed of the engine is lower than the predetermined speed and the cooling load of the passenger compartment is in a range between the first predetermined value and the second predetermined value.

15. The air conditioning apparatus according to claim 14, wherein said second control unit selects a second air mode where at least inside air is introduced into said air conditioning case, when the cooling load is larger than the second predetermined value.

\* \* \* \* \*